US 11,867,318 B2

(12) United States Patent
Doi et al.

(10) Patent No.: US 11,867,318 B2
(45) Date of Patent: Jan. 9, 2024

(54) HIGH-PRESSURE FLUID DISCHARGE DEVICE

(71) Applicant: SMC CORPORATION, Chiyoda-ku (JP)

(72) Inventors: Yoshitada Doi, Koshigaya (JP); Masayuki Oshima, Tsukuba (JP); Hiroaki Sasaki, Moriya (JP); Naomi Hasegawa, Ishioka (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 17/764,408

(22) PCT Filed: Jun. 16, 2020

(86) PCT No.: PCT/JP2020/023523
§ 371 (c)(1),
(2) Date: Mar. 28, 2022

(87) PCT Pub. No.: WO2021/065090
PCT Pub. Date: Apr. 8, 2021

(65) Prior Publication Data
US 2022/0333700 A1    Oct. 20, 2022

(30) Foreign Application Priority Data
Oct. 2, 2019  (JP) ................. 2019-181790

(51) Int. Cl.
F16K 7/17      (2006.01)
F16K 31/385    (2006.01)

(52) U.S. Cl.
CPC .............. F16K 7/17 (2013.01); F16K 31/385 (2013.01)

(58) Field of Classification Search
CPC ......... F16K 31/385; F16K 7/17; F16K 31/128
See application file for complete search history.

(56) References Cited

U.S. PATENT DOCUMENTS 3,235,185 A * 2/1966 Enssle .................. B05B 7/1263
239/411
3,806,081 A * 4/1974 Otto ...................... F16K 31/385
251/28

(Continued)

FOREIGN PATENT DOCUMENTS

DE    10 2019 103 165 A1    8/2019
JP    2004-324659 A    11/2004

(Continued)

OTHER PUBLICATIONS

International Search Report dated Aug. 18, 2020 in PCT/JP2020/023523 filed on Jun. 16, 2020, 2 pages.

(Continued)

Primary Examiner — Umashankar Venkatesan
(74) Attorney, Agent, or Firm — Oblon, McClelland, Maier & Neustadt, L.L.P.

(57) ABSTRACT

A high-pressure fluid discharge device that can adapt to large flow rates while being small in size has a diaphragm valve body that cooperates with a valve seat provided to a body to switch between communication and blocking between a first flow path and a second flow path. A pilot chamber and a valve chamber joined to the first flow path are sectioned by the diaphragm valve body, and the diaphragm valve body is provided with a pilot passage allowing communication between the valve chamber and the pilot chamber. The diaphragm valve body is also provided with a pilot-type spool valve that switches between communication and blocking between the pilot chamber and an excretion port.

7 Claims, 6 Drawing Sheets

(56) References Cited

U.S. PATENT DOCUMENTS

| | | | |
|---|---|---|---|
| 9,061,325 B2* | 6/2015 | West | B08B 9/0326 |
| 9,637,905 B2* | 5/2017 | Hauth | F16K 31/3855 |
| 11,255,448 B2* | 2/2022 | Komatsuzaki | F16K 7/17 |
| 11,278,940 B2* | 3/2022 | Takada | F16K 31/385 |
| 2003/0155541 A1* | 8/2003 | Sheydayi | F16K 7/17 |
| | | | 251/282 |
| 2003/0189111 A1* | 10/2003 | Heren | F16K 31/3855 |
| | | | 239/525 |
| 2017/0036045 A1* | 2/2017 | Townsend | A62B 7/04 |
| 2021/0156491 A1 | 5/2021 | Arakawa | |
| 2021/0252561 A1 | 8/2021 | Takada et al. | |

FOREIGN PATENT DOCUMENTS

| | | |
|---|---|---|
| JP | 2014-83518 A | 5/2014 |
| JP | 6429133 B1 | 11/2018 |
| KR | 10-1989-0008493 A | 7/1989 |
| WO | WO 2019/073834 A1 | 4/2019 |

OTHER PUBLICATIONS

Office Action dated Sep. 7, 2023 in Korean Patent Application No. 10-2022-7014404 w/English Machine Translation.
Extended European Search Report dated Sep. 27, 2023, in European Patent Application No. 20870762.0.

* cited by examiner

HIGH-PRESSURE FLUID DISCHARGE DEVICE

TECHNICAL FIELD

The present invention relates to a high-pressure fluid discharge device configured to discharge a high-pressure fluid.

BACKGROUND ART

For example, in order to clean the surface of a workpiece by removing metal chips that adhere to the surface of the workpiece during a cutting process, a device that blows a high-pressure fluid such as compressed air against the workpiece has been used.

In JP 2014-083518 A, an intermittent air blow gun is disclosed which is used for such an application. In such an intermittent air blow gun, when an operator grasps a switch lever, an on-off valve of an air ejection flow path is opened, and air from a pressurized air source is ejected from the discharge port. Simultaneously therewith, a portion of the air flowing through the air ejection flow path is supplied to a pilot valve, and when the pilot valve is opened, a portion of the air from the pressurized air source passes through a bypass flow path, is delivered to a secondary side of the on-off valve, and the on-off valve is closed.

However, in order to discharge the air with such an air blow gun, it is necessary for the operator to grasp the lever and operate the air blow gun at an operating site, and for example, in the case that the air blow gun must be operated in a location where splash of water is scattered, an inconvenience arises in that the operator may become wet.

Further, in JP 6429133 B1, there is disclosed a pilot solenoid valve in which, by supplying electrical current to a solenoid coil, a pilot valve body is driven together with a movable iron core, and by generating a difference in pressure between a flow path of a pressure fluid and a pressure chamber that is partitioned from the flow path by a main valve body such as a diaphragm or the like, the main valve body is driven in a valve opening direction. If such a solenoid valve is used as a high-pressure fluid discharge device, it is possible to remotely control the high-pressure fluid discharge device.

SUMMARY OF THE INVENTION

However, the pilot type solenoid valve disclosed in JP 6429133 B1 adopts a (direct drive type of) method in which the pilot valve body facing the flow path is directly driven by supplying electrical current to the solenoid coil, and in order to cope with a large flow rate, it is necessary to increase the power supply. More specifically, in order to suppress vibrations of the main valve body and to stably carry out an opening/closing operation, it becomes necessary to provide a return spring having a strong biasing force, and a solenoid coil or the like to which a large amount of electrical current is capable of being supplied. Therefore, there is a concern that the device may become large in scale.

The present invention has been devised taking such circumstances into consideration, and has the object of providing a high-pressure fluid discharge device which is capable of coping with a large flow rate while being small in scale.

A high-pressure fluid discharge device according to the present invention comprises: a body in which a first flow path communicating with an input port and a second flow path communicating with an output port are formed; and a diaphragm valve body configured to operate in conjunction with a valve seat provided in the body to switch between allowing and blocking communication between the first flow path and the second flow path. In addition, a valve chamber joined to the first flow path and a pilot chamber are defined by the diaphragm valve body, a pilot passage configured to allow communication between the valve chamber and the pilot chamber is provided in the diaphragm valve body, and the high-pressure fluid discharge device comprises a pilot type spool valve configured to switch between allowing and blocking communication between the pilot chamber and a discharge port.

According to the above-described high-pressure fluid discharge device, since only a small amount of electrical power is needed to operate the pilot type spool valve, which does not face the flow path, the high-pressure fluid discharge device is capable of discharging the high-pressure fluid with a large flow rate while being small in scale.

Since the high-pressure fluid discharge device according to the present invention is provided with the pilot type spool valve that switches between allowing and blocking communication between the pilot chamber and the discharge port, the high-pressure fluid discharge device is capable of coping with a large flow rate while being small in scale.

DESCRIPTION OF THE INVENTION

Figure 1:
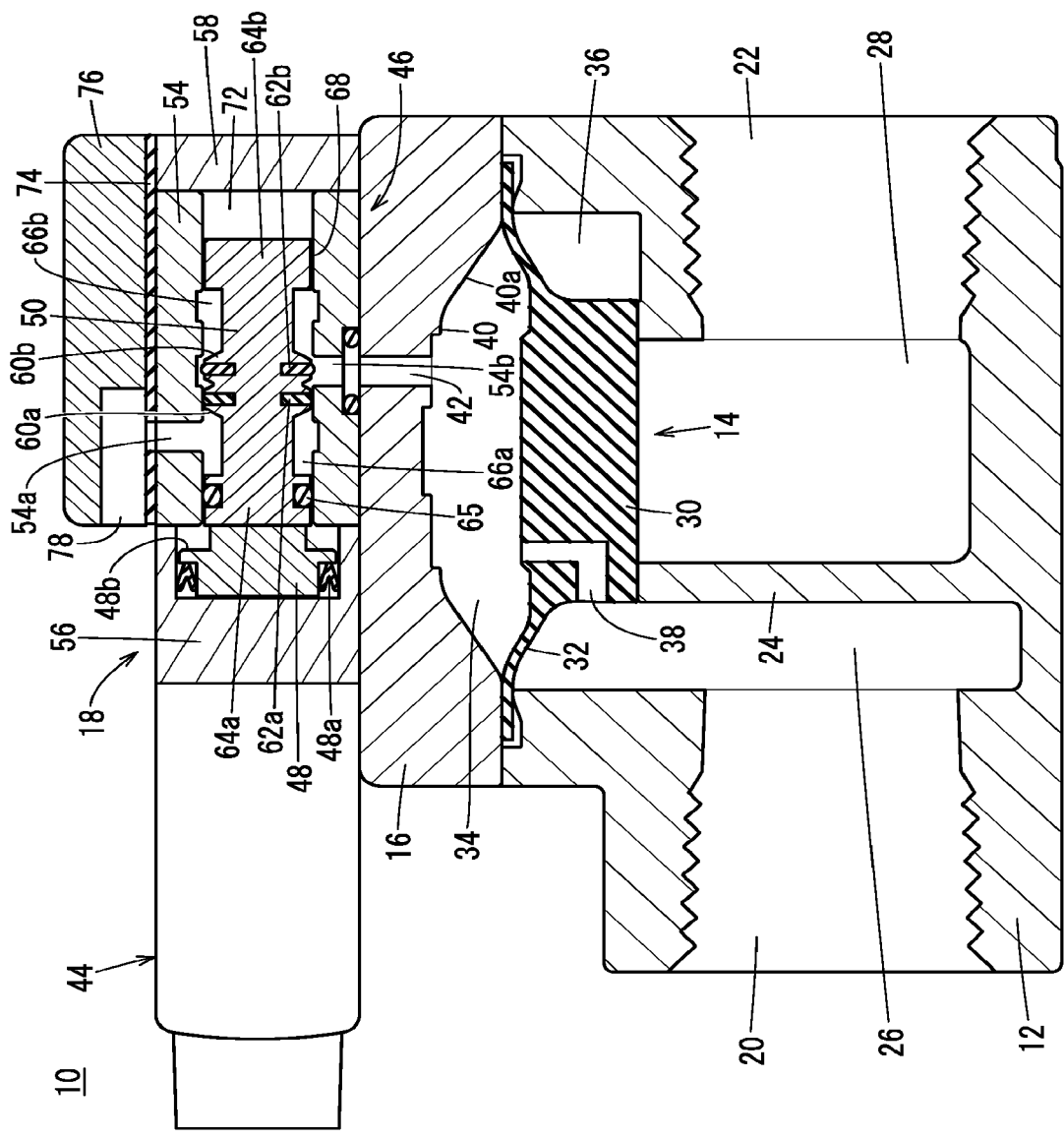
FIG. 1 is a cross-sectional view of a high-pressure fluid discharge device according to an embodiment of the present invention.

Hereinafter, in relation to a basic configuration of a high-pressure fluid discharge device according to the present invention, a preferred embodiment thereof will be presented and described below with reference to the accompanying drawings. Moreover, in the following description, when terms in relation to up, down, left, and right directions are used, for the sake of convenience, such terms refer to the directions in the drawings, however, the actual arrangement of the constituent members or the like is not limited thereby.

Figure 2:
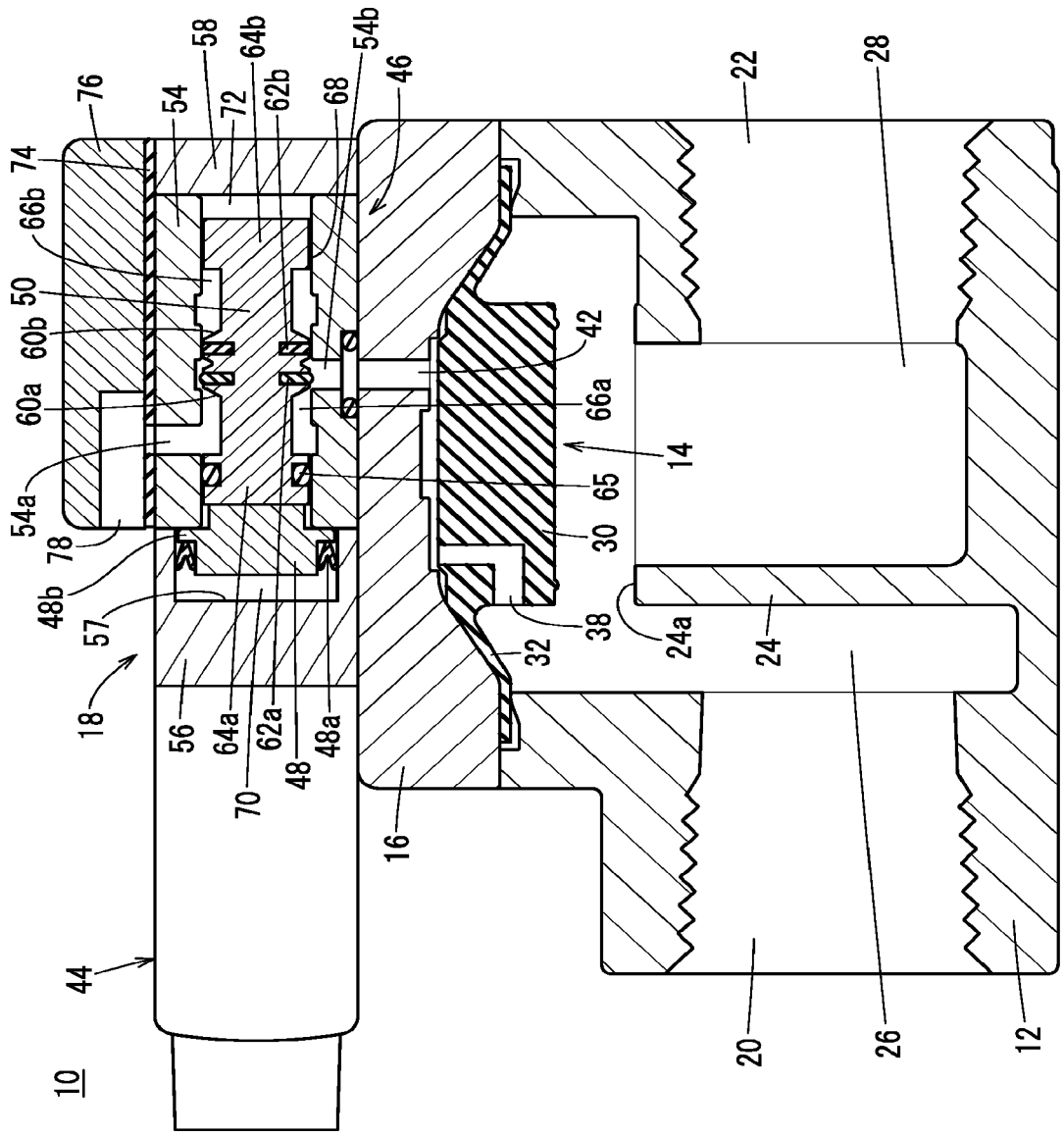
FIG. 2 is a view corresponding to FIG. 1 at a time when the high-pressure fluid discharge device shown in FIG. 1 is placed in a different operating state.

As shown in FIGS. 1 and 2, a high-pressure fluid discharge device 10 includes a body 12 in which a flow path for a pressure fluid such as compressed air or the like is formed, a diaphragm valve body 14 accommodated inside the body 12, a bonnet 16 disposed above the body 12, and a pilot type spool valve 18 disposed above the bonnet 16.

An input port 20 for introducing a pressure fluid such as compressed air or the like into the body 12 is provided on a left side end portion of the body 12, and an output port 22 for discharging, to the exterior, the pressure fluid that has been introduced into the body 12 is provided on a right side end portion of the body 12. A partition wall 24 is provided in the center of the body 12, and the flow path for the pressure fluid is partitioned by the partition wall 24 into a first flow path 26 in communication with the input port 20, and a second flow path 28 in communication with the output port 22. A valve seat 24a on which the diaphragm valve body 14 is seated is provided on an upper end portion of the partition wall 24.

The diaphragm valve body 14 includes a thick-walled main body portion 30 having a cylindrical shape, and a flange portion 32 that is thinner than the main body portion 30 and is flexible. An outer circumferential edge part of the flange portion 32 is sandwiched between the body 12 and the bonnet 16. The diaphragm valve body 14 is capable of being seated on the valve seat 24a of the partition wall 24 on a bottom surface of the main body portion 30. When the diaphragm valve body 14 separates away from the valve seat 24a, the first flow path 26 and the second flow path 28 communicate with each other, and when the diaphragm valve body 14 is seated on the valve seat 24a, the communication between the first flow path 26 and the second flow path 28 is blocked.

A pilot chamber 34 is formed above the diaphragm valve body 14, and more specifically, at a location between the diaphragm valve body 14 and the bonnet 16, and an annular valve chamber 36 which is joined to the first flow path 26 is formed laterally of the main body portion 30 of the diaphragm valve body 14. A pilot passage 38 for allowing the valve chamber 36 and the pilot chamber 34 to communicate with each other is provided inside the main body portion 30 of the diaphragm valve body 14. One end of the pilot passage 38 opens on a side surface of the main body portion 30 that faces the valve chamber 36, and another end of the pilot passage 38 opens on an upper surface of the main body portion 30 that faces the pilot chamber 34.

A recessed portion 40 that defines the pilot chamber 34 is provided on a lower surface of the bonnet 16. The recessed portion 40 includes an inclined surface 40a that abuts against the flange portion 32 of the diaphragm valve body 14 when the diaphragm valve body 14 moves upward. The bonnet 16 is provided with a communication passage 42 that penetrates in an upper-lower direction. An upper end of the communication passage 42 opens toward the pilot type spool valve 18, and a lower end of the communication passage 42 faces the recessed portion 40.

The pilot type spool valve 18 is formed of: a drive unit 44 that supplies a pilot pressure due to compressed air or the like to a spool valve unit 46; and the spool valve unit 46, the operating state of which is switched by the pilot pressure supplied from the drive unit 44. The drive unit 44 and the spool valve unit 46 extend in a left-right direction and are connected to each other at the respective ends thereof. Moreover, it should be noted that, in FIGS. 1 and 2, the spool valve unit 46 is shown in the form of a cross-sectional view, however, the external shape of the drive unit 44 is shown.

The spool valve unit 46 is provided with a spool valve body 50 having a piston 48 integrally connected to one end thereof. An outer diameter (maximum outer diameter) of the piston 48 is greater than an outer diameter (maximum outer diameter) of the spool valve body 50. The spool valve body 50 and the piston 48 are supported so as to be capable of sliding in the left-right direction inside a valve housing fixed to an upper surface of the bonnet 16.

The valve housing includes a central housing 54 having a hole that penetrates in the left-right direction, an end housing 56 having a bottomed hole, and an end plate 58. The central housing 54 serves to guide an outer circumferential surface of the spool valve body 50. The end housing 56 serves to guide an outer circumferential surface of the piston 48 and closes one end side of the central housing 54. The end plate 58 closes another end side of the central housing 54. A first passage 54a that penetrates in a radial direction is provided in an upper part of the central housing 54, and a second passage 54b that penetrates in a radial direction is provided in a lower part of the central housing 54. The second passage 54b is disposed at a position corresponding to the communication passage 42 of the bonnet 16, and communicates with the pilot chamber 34 via the communication passage 42.

A first land portion 60a and a second land portion 60b are provided at a predetermined interval in the axial direction in the vicinity of the center of the spool valve body 50. A first packing 62a, which is mounted on the first land portion 60a, is capable of abutting against an inner circumferential surface of the central housing 54 on the left side of the second passage 54b. A second packing 62b, which is mounted on the second land portion 60b, is capable of abutting against the inner circumferential surface of the central housing 54 on the right side of the second passage 54b.

An annular first groove portion 66a is formed between a first end portion 64a, which is an end portion of the spool valve body 50 on a side in close proximity to the piston 48, and the first land portion 60a. The first groove portion 66a communicates with the first passage 54a of the central housing 54, irrespective of the sliding position of the spool valve body 50. An annular second groove portion 66b is formed between a second end portion 64b, which is an end portion of the spool valve body 50 on a side separated away from the piston 48, and the second land portion 60b.

A seal ring 65, which is in sliding contact with the inner circumferential surface of the central housing 54, is mounted on the first end portion 64a of the spool valve body 50. On the other hand, a predetermined gap 68 is secured between an outer circumferential surface of the second end portion 64b of the spool valve body 50 and the inner circumferential surface of the central housing 54, and the second groove portion 66b communicates, via the gap 68, with a space, and more specifically, a second operation chamber 72, provided between the second end portion 64b and the end plate 58. When the second groove portion 66b communicates with the second passage 54b of the central housing 54, the pressure fluid in the pilot chamber 34 is introduced into the second operation chamber 72.

A piston packing 48a, which is in sliding contact with an inner circumferential surface of the hole of the end housing 56, is mounted on an outer circumference of the piston 48. A first operation chamber 70 to which the pilot pressure from the drive unit 44 is introduced when electrical current is supplied to the drive unit 44 is formed between the piston 48 and a bottom surface 57 of the hole of the end housing 56.

The spool valve body 50 and the piston 48 are capable of moving between a position where an end surface of the piston 48 abuts against the bottom surface 57 of the hole of the end housing 56 (see FIG. 1), and a position where a flange 48b provided on the outer circumference of the piston 48 abuts against an end surface of the central housing 54 (see FIG. 2).

When the end surface of the piston 48 is at and in the vicinity of a position where it abuts against the bottom surface 57 of the hole of the end housing 56, the second passage 54*b* of the central housing 54 communicates with the second groove portion 66*b* of the spool valve body 50. When the flange 48*b* of the piston 48 is at and in the vicinity of a position where it abuts against the end surface of the central housing 54, the second passage 54*b* of the central housing 54 communicates with the first groove portion 66*a* of the spool valve body 50.

An upper plate 76 is disposed above the spool valve unit 46 via a flat gasket 74. A discharge port 78, which is formed on a lower surface of the upper plate 76, communicates with the first passage 54*a* of the central housing 54.

The high-pressure fluid discharge device 10 according to the embodiment of the present invention is basically configured in the manner described above. Hereinafter, with reference to FIGS. 1 and 2, operations thereof will be described.

As shown in FIG. 1, a state in which the main body portion 30 of the diaphragm valve body 14 abuts against the valve seat 24*a*, and the end surface of the piston 48 abuts against the bottom surface 57 of the hole of the end housing 56 is defined as an initial state. At this time, electrical current is not being supplied to the drive unit 44. Further, it is assumed that the pressure fluid has not yet been introduced into the body 12 from the input port 20.

In the aforementioned initial state, the first packing 62*a* mounted on the first land portion 60*a* of the spool valve body 50 abuts against the inner circumferential surface of the central housing 54 on the left side of the second passage 54*b*, whereas the second packing 62*b* mounted on the second land portion 60*b* is not placed in abutment against the inner circumferential surface of the central housing 54. More specifically, the second passage 54*b* of the central housing 54 communicates with the second groove portion 66*b* of the spool valve body 50, and communication between the second passage 54*b* of the central housing 54 and the first groove portion 66*a* of the spool valve body 50 is blocked.

Therefore, the pilot chamber 34 communicates with the second operation chamber 72 via the communication passage 42 of the bonnet 16, the second passage 54*b* of the central housing 54, the second groove portion 66*b* of the spool valve body 50, and the gap 68 between the outer circumferential surface of the second end portion 64*b* of the spool valve body 50 and the inner circumferential surface of the central housing 54.

In the aforementioned initial state, when the pressure fluid is introduced into the body 12 from the input port 20, the pressure fluid is supplied to the pilot chamber 34 via the pilot passage 38. Since the diaphragm valve body 14 receives a downwardly directed pressure over a wide area due to the pressure fluid supplied to the pilot chamber 34, the diaphragm valve body 14 is strongly pressed against the valve seat 24*a*, and communication between the first flow path 26 and the second flow path 28 is reliably blocked. The pressure fluid is not discharged from the output port 22.

Further, the pressure fluid supplied to the pilot chamber 34 is introduced into the second operation chamber 72, the spool valve body 50 is pressed to the left by the pressure fluid that is introduced into the second operation chamber 72, and a state in which the end surface of the piston 48 abuts against the bottom surface 57 of the hole of the end housing 56 is maintained.

In this instance, when electrical current is supplied to the drive unit 44, the pilot pressure from the drive unit 44 is introduced into the first operation chamber 70. The piston 48 and the spool valve body 50 which is integral with the piston 48 are pressed to the right by the pilot pressure. Since the outer diameter of the piston 48 is greater than the outer diameter of the spool valve body 50, such a pressing force exceeds the force of pressing the spool valve body 50 to the left by the pressure fluid that is introduced into the second operation chamber 72. Accordingly, the spool valve body 50 moves to the right.

Then, the second packing 62*b* mounted on the second land portion 60*b* of the spool valve body 50 abuts against the inner circumferential surface of the central housing 54 on the right side of the second passage 54*b*, and the first packing 62*a* mounted on the first land portion 60*a* separates away from the inner circumferential surface of the central housing 54. As shown in FIG. 2, the spool valve body 50 moves to the right until the flange 48*b* of the piston 48 abuts against the end surface of the central housing 54.

By the spool valve body 50 moving to the right, the pilot chamber 34 communicates with the discharge port 78 via the communication passage 42 of the bonnet 16, the second passage 54*b* of the central housing 54, the first groove portion 66*a* of the spool valve body 50, and the first passage 54*a* of the central housing 54. Consequently, the pressure fluid stored in the pilot chamber 34 is discharged from the discharge port 78, and the diaphragm valve body 14 separates away from the valve seat 24*a*.

When the diaphragm valve body 14 separates away from the valve seat 24*a*, the first flow path 26 and the second flow path 28 communicate with each other, and the pressure fluid that is introduced into the body 12 from the input port 20 flows from the first flow path 26 into the second flow path 28, and is discharged at once from the output port 22. At that time, since communication between the pilot passage 38 and the second operation chamber 72 is blocked, the spool valve body 50 can be driven without being affected by a drop in pressure inside the first flow path 26.

Thereafter, when the supply of electrical current to the drive unit 44 is stopped, supplying of the pilot pressure to the first operation chamber 70 is stopped, and the fluid such as compressed air or the like that is stored in the first operation chamber 70 is discharged to the exterior. On the other hand, in the step after the spool valve body 50 has moved to the right, since the pressure of the fluid inside the second operation chamber 72 is greater than or equal to a predetermined value, the spool valve body 50 moves to the left.

Then, the first packing 62*a* mounted on the first land portion 60*a* of the spool valve body 50 abuts against the inner circumferential surface of the central housing 54 on the left side of the second passage 54*b*, and the second packing 62*b* mounted on the second land portion 60*b* separates away from the inner circumferential surface of the central housing 54. The spool valve body 50 moves to the left until the end surface of the piston 48 abuts against the bottom surface 57 of the hole of the end housing 56.

By the spool valve body 50 moving to the left, communication between the second passage 54*b* of the central housing 54 and the first groove portion 66*a* of the spool valve body 50 is blocked, and the pressure fluid in the pilot chamber 34 is not discharged from the discharge port 78. Therefore, the pressure fluid introduced into the body 12 from the input port 20 is supplied and accumulated in the pilot chamber 34 via the pilot passage 38. The diaphragm valve body 14 is pressed downward by the pressure fluid that is supplied and accumulated in the pilot chamber 34, whereby the diaphragm valve body 14 moves downward and abuts against the valve seat 24*a*. Consequently, the communication between the first flow path 26 and the second flow path 28 is blocked, and discharging of the pressure fluid from the output port 22 is stopped.

Thereafter, by repeatedly supplying electrical current to and stopping the supply of electrical current to the drive unit 44 in a state in which the pressure fluid is introduced into the body 12 from the input port 20, the pressure fluid is intermittently discharged from the output port 22.

In accordance with the high-pressure fluid discharge device 10 according to the present embodiment, since opening and closing of the diaphragm valve body 14 is controlled by the pilot type spool valve 18, the device can be made small in scale. More specifically, since the spool valve body 50 is operated by the pilot pressure from the drive unit 44 and the pressure fluid that is introduced from the pilot chamber 34, only a small amount of electrical power is needed to drive the spool valve body 50.

In order to drive the pilot type spool valve body 50, a pilot pressure which is greater than or equal to a certain level is required, and because the drop in pressure thereof is large, the supply pressure used for blowing air cannot be used for the pilot pressure. With the high-pressure fluid discharge device 10 according to the present embodiment, during blowing of the air, communication between the pilot passage 38 and the second operation chamber 72 is blocked, whereby the spool valve body 50 can be driven without being affected by a drop in pressure. Further, the pressure fluid in the pilot chamber 34 is introduced into the spool valve body 50 via the gap between the outer circumferential surface of the spool valve body 50 and the inner circumferential surface of the central housing 54, and therefore, the configuration of the flow path can be simplified.

Next, descriptions will be given with reference to FIG. 3 to FIG. 6 concerning a plurality of modes of use of the above-described high-pressure fluid discharge device 10. Each of such modes of use is characterized by a device or the like connected to the input port 20.

First Mode of Use

Figure 3:
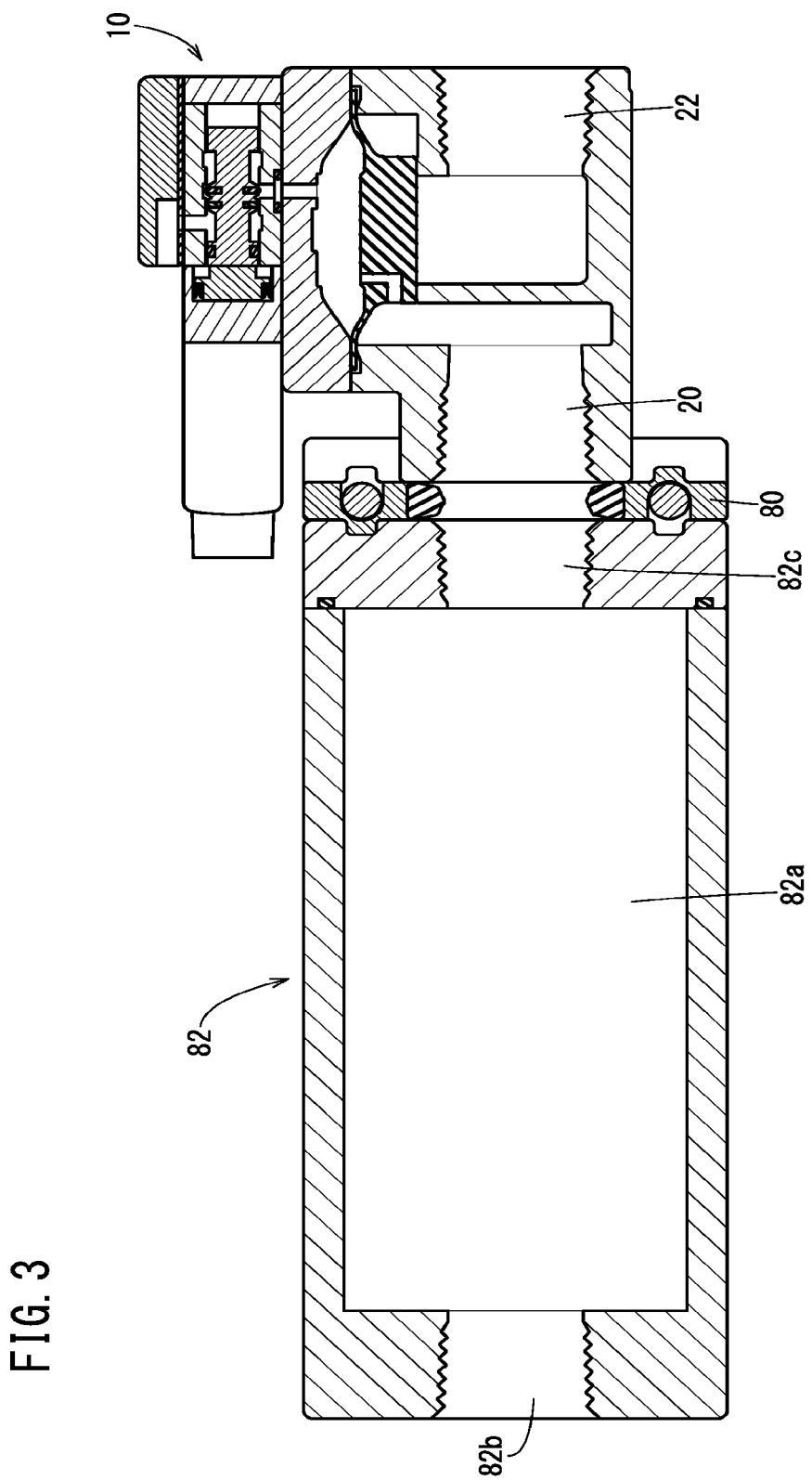
FIG. 3 is a view showing a mode of use in which a tank is connected to the high-pressure fluid discharge device shown in FIG. 1.

As shown in FIG. 3, a tank 82 is connected to the input port 20 of the high-pressure fluid discharge device 10 via a connection attachment 80. The tank 82 is provided with a tank chamber 82a having a predetermined capacity in the interior thereof, an inlet port 82b for connection to a pipe, and an outlet port 82c connected to the input port 20 of the high-pressure fluid discharge device 10.

When the pressure fluid is supplied from the inlet port 82b via a pipe (not shown), after the pressure fluid has accumulated in the tank chamber 82a, the pressure fluid passes through the outlet port 82c and is supplied to the input port 20 of the high-pressure fluid discharge device 10. A fluid having a high peak pressure corresponding to the capacity of the tank chamber 82a is discharged from the output port 22 of the high-pressure fluid discharge device 10.

Second Mode of Use

Figure 4:
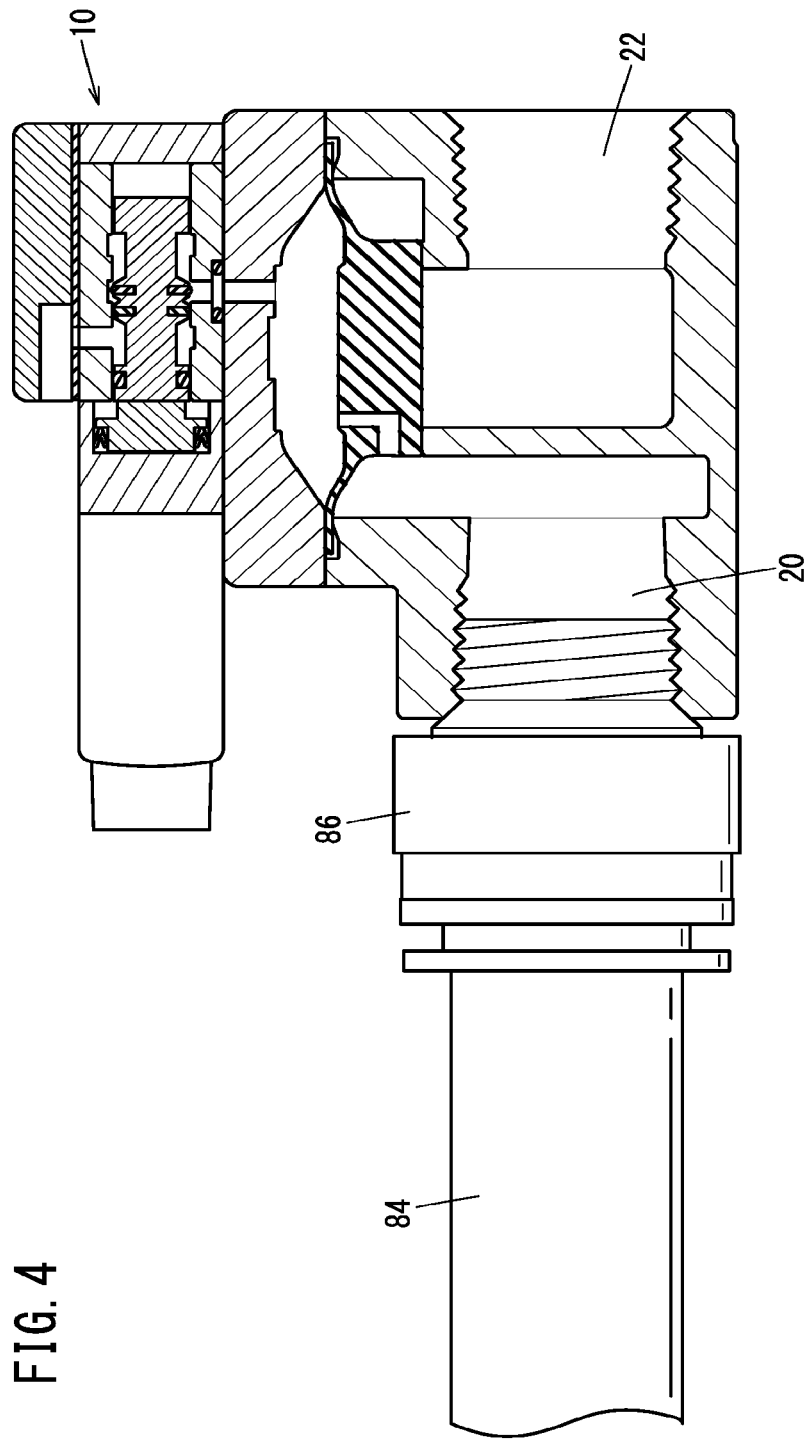
FIG. 4 is a view showing a mode of use in which a straight line shaped pipe having a function equivalent to that of a tank is connected to the high-pressure fluid discharge device shown in FIG. 1.

As shown in FIG. 4, a linear pipe 84 is connected to the input port 20 of the high-pressure fluid discharge device 10 via a fitting 86. A thickness or a length of the linear pipe 84 is set so that the pipe 84 has a capacity equivalent to that of the tank 82. Consequently, a fluid having a high peak pressure can be discharged from the output port 22 of the high-pressure fluid discharge device 10.

Third Mode of Use

Figure 5:
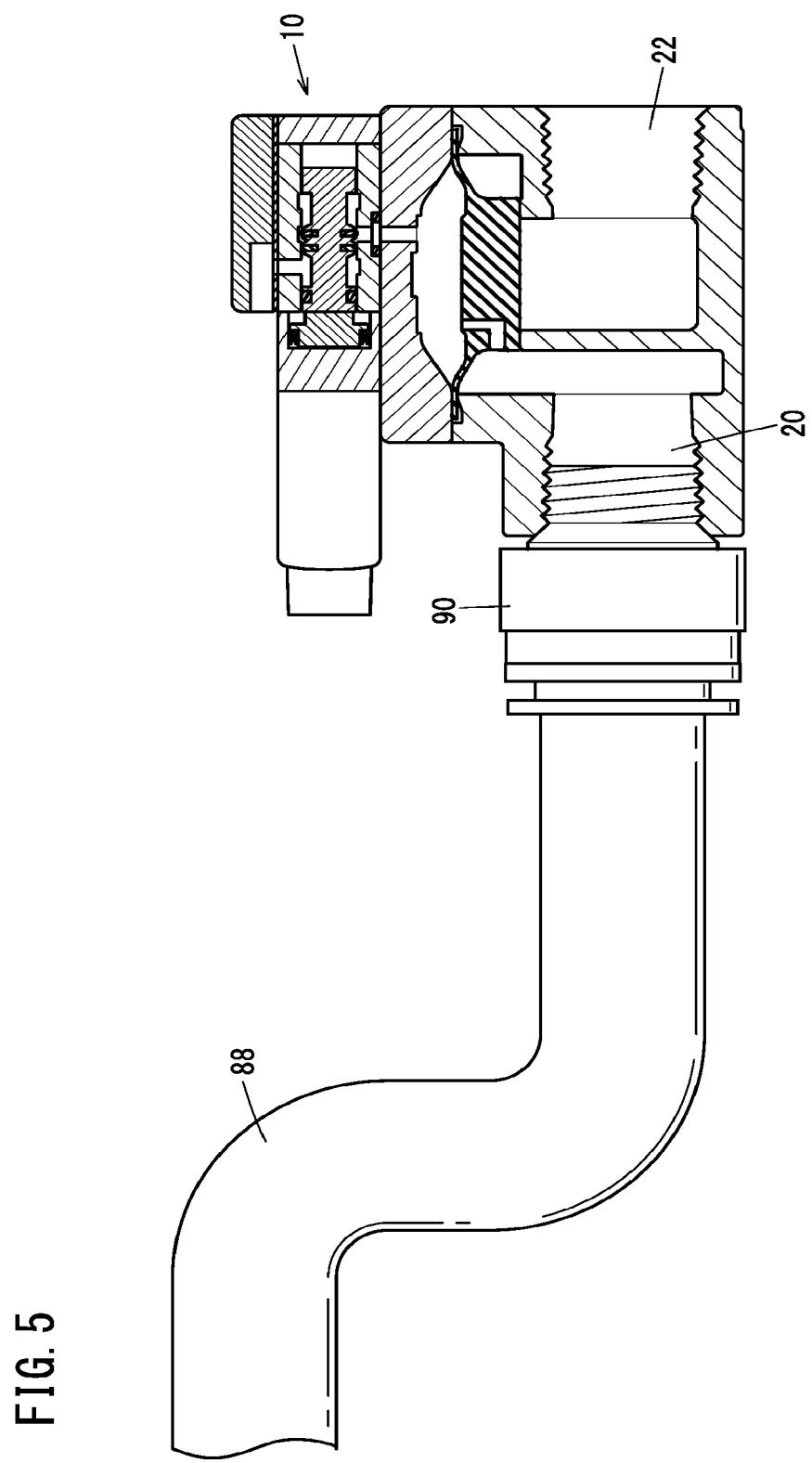
FIG. 5 is a view showing a mode of use in which a bent pipe having a function equivalent to that of a tank is connected to the high-pressure fluid discharge device shown in FIG. 1.

As shown in FIG. 5, a crank shaped or bent pipe 88, which is bent to fit into a narrow space in the device, is connected to the input port 20 of the high-pressure fluid discharge device 10 via a fitting 90. A thickness or a length of the bent pipe 88 is set so that the pipe 88 has a capacity equivalent to that of the tank 82. Consequently, a fluid having a high peak pressure can be discharged from the output port 22 of the high-pressure fluid discharge device 10.

Fourth Mode of Use

Figure 6:
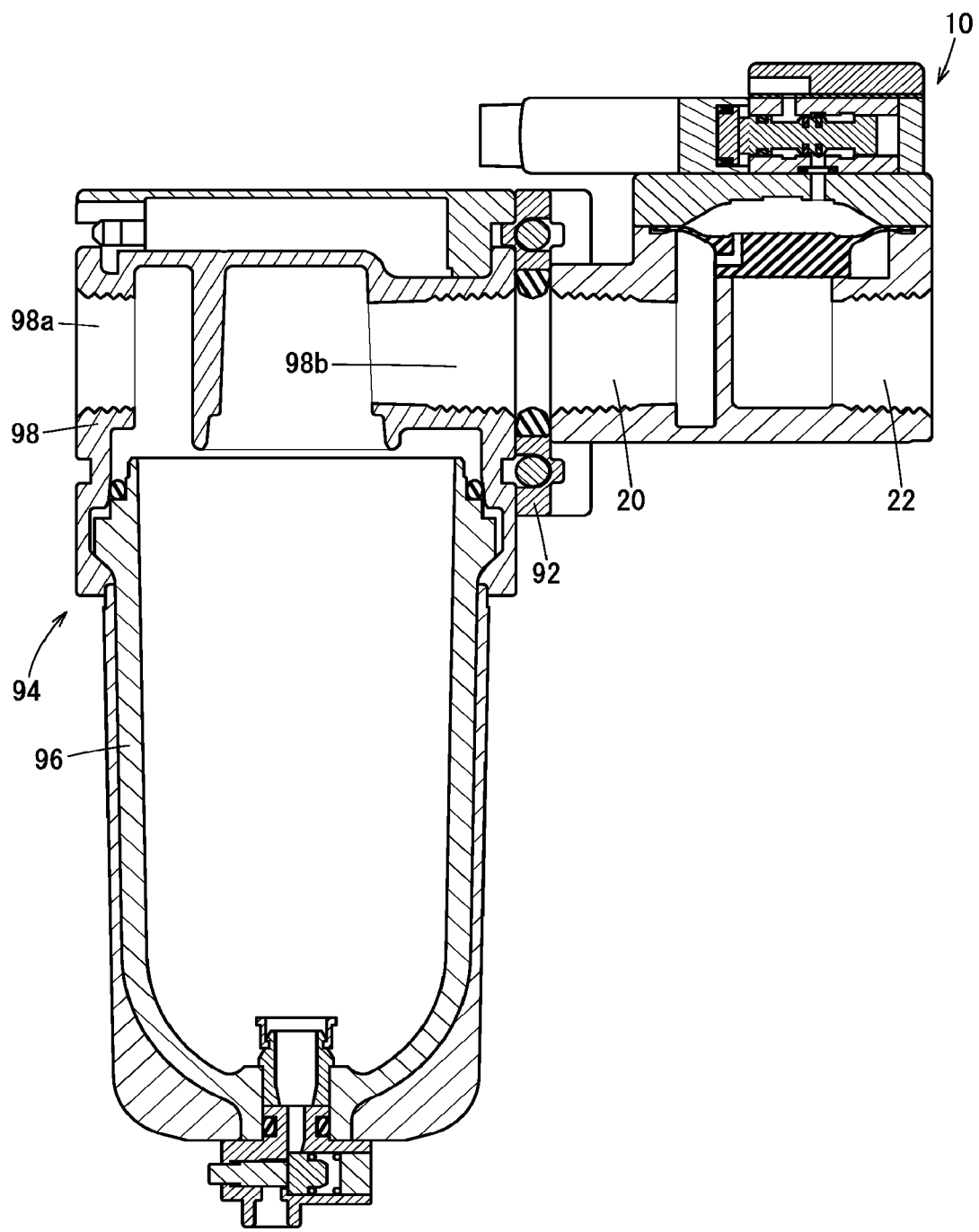
FIG. 6 is a view showing a mode of use in which a filter is connected to the high-pressure fluid discharge device shown in FIG. 1.

As shown in FIG. 6, a filter 94 is connected to the input port 20 of the high-pressure fluid discharge device 10 via a connection attachment 92. The filter 94 is provided with a case 96 in which a filter unit (not shown) is accommodated in the interior thereof, and a body 98 that is coupled to the case 96 and includes an inlet port 98a and an outlet port 98b.

When the pressure fluid is supplied from the inlet port 98a via a pipe (not shown), after dust and the like have been removed from the pressure fluid by the filter unit, the pressure fluid passes through the outlet port 98b and is supplied to the input port 20 of the high-pressure fluid discharge device 10. Since the pressure fluid, which is cleaned by the filter unit, is supplied to the high-pressure fluid discharge device 10, its durability is enhanced.

The high-pressure fluid discharge device according to the present invention is not limited to the above-described embodiment, and it is a matter of course that various configurations could be adopted therein without departing from the essence and gist of the present invention.

The invention claimed is:

1. A high-pressure fluid discharge device, comprising:
    a body in which a first flow path communicating with an input port and a second flow path communicating with an output port are formed; and a diaphragm valve body configured to operate in conjunction with a valve seat provided in the body to switch between allowing and blocking communication between the first flow path and the second flow path,
    wherein a valve chamber joined to the first flow path and a pilot chamber are defined. by the diaphragm valve body, a pilot passage configured to allow communication between the valve chamber and the pilot chamber is provided in the diaphragm valve body, and the high-pressure fluid discharge device comprises a pilot type spool valve configured to switch between allowing and blocking communication between the pilot chamber and a discharge port,
    wherein the high-pressure fluid discharge device is configured to supply a pilot pressure from a drive unit of the pilot type spool valve to a first end side of a spool valve body of the pilot type spool valve, and is configured to introduce a pressure fluid in the pilot chamber into a second end side of the spool valve body, and
    wherein the pressure fluid in the pilot chamber is introduced into the second end side of the spool valve body via a nap between an outer circumferential surface of the spool valve body and an inner circumferential surface of a valve housing.

2. The high-pressure fluid discharge device according to claim 1, herein a piston having an outer diameter larger than an outer diameter of the spool valve body is connected to one end of the spool valve body.

3. The high-pressure fluid discharge device according to claim 1, wherein a tank is connected to the input port.

4. The high-pressure fluid discharge device according to claim 1, wherein a linear pipe having a function equivalent to a function of a tank is connected to the input port.

5. The high-pressure fluid discharge device according to claim 1, wherein a bent pipe having a function equivalent to a function of a tank is connected to the input port.

6. The high-pressure fluid discharge device according to claim 1, wherein a filter is connected to the input port.

7. The high-pressure fluid discharge device according to claim 1, further comprising a communication passage communicating the pressure fluid in the pilot chamber with the spool valve body, wherein the communication passage and the pilot type spool valve are oriented such that the pressure fluid causes the spool valve to move in a direction transverse to a length of the communication passage.

\* \* \* \* \*